United States Patent
Nojiri

(10) Patent No.: US 8,749,853 B2
(45) Date of Patent: Jun. 10, 2014

(54) IMAGE DATA DISPLAY APPARATUS, IMAGE DATA DISPLAY METHOD, AND IMAGE DATA DISPLAY COMPUTER PROGRAM PRODUCT

(75) Inventor: Kohei Nojiri, Saitama (JP)

(73) Assignee: Sony Corporation, Tokyo (JP)

( * ) Notice: Subject to any disclaimer, the term of this patent is extended or adjusted under 35 U.S.C. 154(b) by 536 days.

(21) Appl. No.: 12/211,227

(22) Filed: Sep. 16, 2008

(65) Prior Publication Data

US 2009/0086280 A1    Apr. 2, 2009

(30) Foreign Application Priority Data

Sep. 28, 2007    (JP) ................ 2007-255212

(51) Int. Cl.
  *G06F 3/12* (2006.01)
  *H04N 1/40* (2006.01)
  *H04N 1/60* (2006.01)

(52) U.S. Cl.
  USPC ................ 358/471; 358/1.15; 358/1.9

(58) Field of Classification Search
  USPC ........... 345/698; 705/26.1, 27; 358/1.16, 471, 358/448, 1.15; 348/272; 353/94; 382/167
  See application file for complete search history.

(56) References Cited

U.S. PATENT DOCUMENTS

| | | | |
|---|---|---|---|
| 6,734,876 B2 * | 5/2004 | Niikawa et al. | 345/698 |
| 7,813,962 B2 * | 10/2010 | Christ et al. | 705/26.1 |
| 2002/0154336 A1 * | 10/2002 | Takei | 358/1.15 |
| 2004/0201752 A1 * | 10/2004 | Parulski et al. | 348/231.99 |
| 2005/0200725 A1 * | 9/2005 | Masumoto et al. | 348/231.2 |
| 2005/0278111 A1 * | 12/2005 | Ujino | 701/200 |
| 2006/0125867 A1 * | 6/2006 | Sakuda et al. | 347/19 |
| 2006/0250419 A1 * | 11/2006 | Shiba et al. | 345/619 |
| 2007/0005447 A1 * | 1/2007 | Christ et al. | 705/27 |
| 2007/0076255 A1 * | 4/2007 | Hamashima et al. | 358/1.16 |
| 2009/0119596 A1 * | 5/2009 | Iwahara et al. | 715/730 |

FOREIGN PATENT DOCUMENTS

| | | |
|---|---|---|
| JP | 2003-118210 | 4/2003 |
| JP | 2004-034597 | 2/2004 |
| JP | 2004-255740 | 9/2004 |
| JP | 2006-186559 | 7/2006 |
| JP | 2006186559 A * | 7/2006 |
| WO | WO 2007055334 A1 * | 5/2007 |

OTHER PUBLICATIONS

Japanese Office Action issued Jul. 19, 2011, in connection with counterpart JP Application No. 2007-255212.

* cited by examiner

*Primary Examiner* — Vincent Rudolph
*Assistant Examiner* — Moustapha Diaby
(74) *Attorney, Agent, or Firm* — Dentons US LLP

(57) ABSTRACT

An image data display apparatus includes a display section configured to display images to be printed in the form of thumbnails; a reception section configured to receive image data and print data for the image data; a memory configured to store the image data and the print data; and a controller configured to determine a display order of the display in the form of thumbnails performed by the display section. The controller extracts from the memory image data items to which the print data is attached, and displays in the form of thumbnails on the display section the image data items to which the print data is attached.

7 Claims, 6 Drawing Sheets

IMAGE DATA DISPLAY APPARATUS, IMAGE DATA DISPLAY METHOD, AND IMAGE DATA DISPLAY COMPUTER PROGRAM PRODUCT

CROSS REFERENCES TO RELATED APPLICATIONS

The present invention contains subject matter related to Japanese Patent Application JP 2007-255212 filed in the Japanese Patent Office on Sep. 28, 2007, the entire contents of which are incorporated herein by reference.

BACKGROUND OF THE INVENTION

1. Field of the Invention

The present invention relates to an image data display apparatus and an image data display method for displaying images to be printed, and more particularly, to an image data display apparatus, an image data display method, and an image data display computer program product for displaying in the form of thumbnails a plurality of received image data items in a predetermined order.

2. Description of the Related Art

Print kiosk terminals for printing images captured with image capturing devices, such as digital still cameras or camera-equipped cellular phones, have been installed in public spaces, such as mass merchandise stores, stations, and hotels, and have been widely used. When a user inserts a memory card in which image data is recorded into a print kiosk terminal of this type, the print kiosk terminal reads the image data from the memory card and displays a list of thumbnail images on a monitor of the print kiosk terminal. The user designates an image from the list of the thumbnail images displayed on the monitor, and printing of the designated image is performed.

In recent years, Digital Print Order Format (DPOF) (registered trademark), which is a data standard for printing image data, has been widely adopted. DPOF is data necessary for printing an image recorded with a digital still camera. DPOF contains information, such as print size, the number of copies to be printed, edit settings including trimming, and captured date and time. In a case where various types of data regarding DPOF are set in advance and stored in a memory card, when the memory card is inserted into a print kiosk terminal, printing can be automatically performed in accordance with the settings. With the use of a menu mode or the like of an image capturing device, a user is able to specify whether DPOF is to be set for a captured image and to perform operation and setting for various types of data regarding DPOF.

Since a print kiosk terminal is capable of performing printing in accordance with the settings of DPOF by reading print data stored, independently of image data, in a memory card, time and effort in setting print data every time printing is performed can be saved. Thus, a desired image can be printed simply and rapidly.

An example of such a technology is described, for example, in Japanese Unexamined Patent Application Publication No. 2004-34597.

SUMMARY OF THE INVENTION

Due to recent increases in the capacity of removable storage media, such as memory cards, the number of images that can be captured with an image capturing device has been significantly increased and the number of image data items that can be stored in a memory card has also been significantly increased. In the case that a memory card in which a large number of image data items are recorded is inserted into a print kiosk terminal, all the image data items stored in the memory card are displayed in the form of thumbnails. Thus, it is difficult for a user to find an image data item that the user wants to print.

In addition, in the case of displaying in the form of thumbnails only image data items for which DPOF data has been prepared by referring to the DPOF data, if DPOF data has been prepared for all the image data items in accordance with settings of an image capturing device, all the image data items are displayed in the form of thumbnails. Thus, in this case, it is also difficult for a user to find an image data item that the user wants to print.

Accordingly, it is desirable to provide an image data display apparatus, an image data display method, and an image data display computer program product that are capable of displaying in the form of thumbnails image data items so that a user can easily find an image data item that the user wants to print from among a large number of image data items.

An image data display apparatus according to an embodiment of the present invention includes a display section configured to display images to be printed in the form of thumbnails; a reception section configured to receive image data and print data for the image data; a memory configured to store the image data and the print data; and a controller configured to determine a display order of the display in the form of thumbnails performed by the display section. The controller extracts from the memory image data items to which the print data is attached, and displays in the form of thumbnails on the display section the image data items to which the print data is attached.

An image data display method according to another embodiment of the present invention includes the steps of receiving, with a reception section, image data and print data for the image data, and storing the received image data and print data into a memory; and extracting, with a controller, from the memory image data items to which the print data is attached, and displaying in the form of thumbnails on a display section the image data items to which the print data is attached.

An image data display computer program product according to another embodiment of the present invention causes a control computer of an image data display apparatus to perform processing including the steps of receiving, with a reception section, image data and print data for the image data, and storing the received image data and print data into a memory; and extracting from the memory image data items to which the print data is attached, and displaying in the form of thumbnails on a display section the image data items to which the print data is attached.

According to an embodiment of the present invention, since an image data item to which print data is attached is more likely to be printed compared with an image data item to which print data is not attached, in the case of generating a list of thumbnails to be displayed, the controller preferentially displays image data items to which print data is attached. Thus, a user is able to first view image data items that are highly likely to be printed. Therefore, the user is able to efficiently find, from among a large number of image data items, an image data item that the user wants to print.

DESCRIPTION OF THE PREFERRED EMBODIMENTS

An image data display apparatus and an image data display method according to an embodiment of the present invention will be described with reference to the drawings. The image data display apparatus described below is installed in a public space, such as a station or a hotel, and is used for a printing system to be applied to a print kiosk terminal for providing a service of printing image data stored in a removable storage medium, such as a memory card, provided by a user. In the light of printing photographs, such a printing system adopts a dye-sublimation thermal transfer printer with excellent color reproducibility as a printing apparatus.

Figure 1:
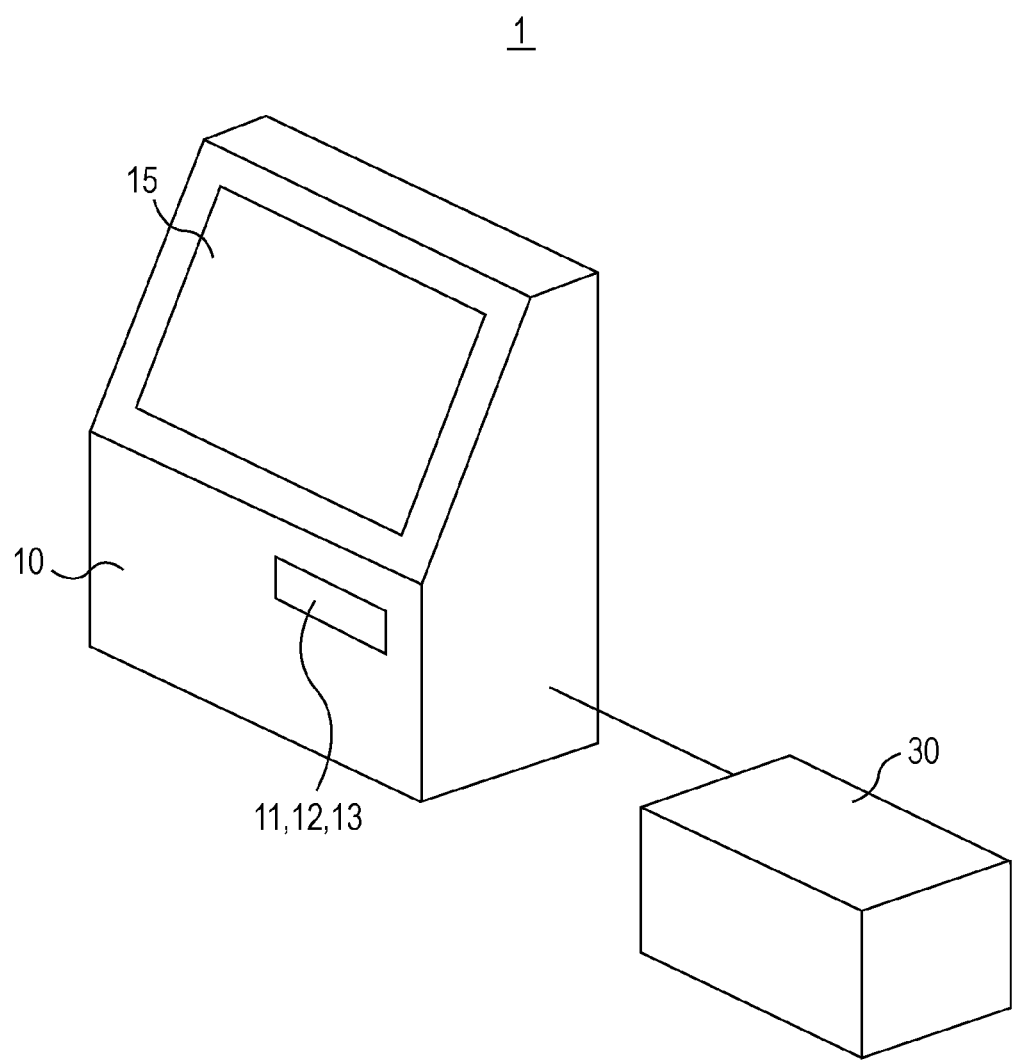
FIG. 1 is a perspective view showing a printing system according to an embodiment of the present invention.

Referring to FIG. 1, a printing system 1 according to an embodiment of the present invention includes an image data display apparatus 10 and a printing apparatus 30. The image data display apparatus 10 is configured to receive image data from a removable recording medium, such as a memory card, and display the image data such that a user can select an image data item that the user wants to print. The printing apparatus 30 is configured to print the image data item selected in the image data display apparatus 10. For example, the image data display apparatus 10 and the printing apparatus 30 are connected in a wired or wireless manner. In addition, for example, the image data display apparatus 10 and the printing apparatus 30 are installed next to each other or built in a single casing.

Figure 2:
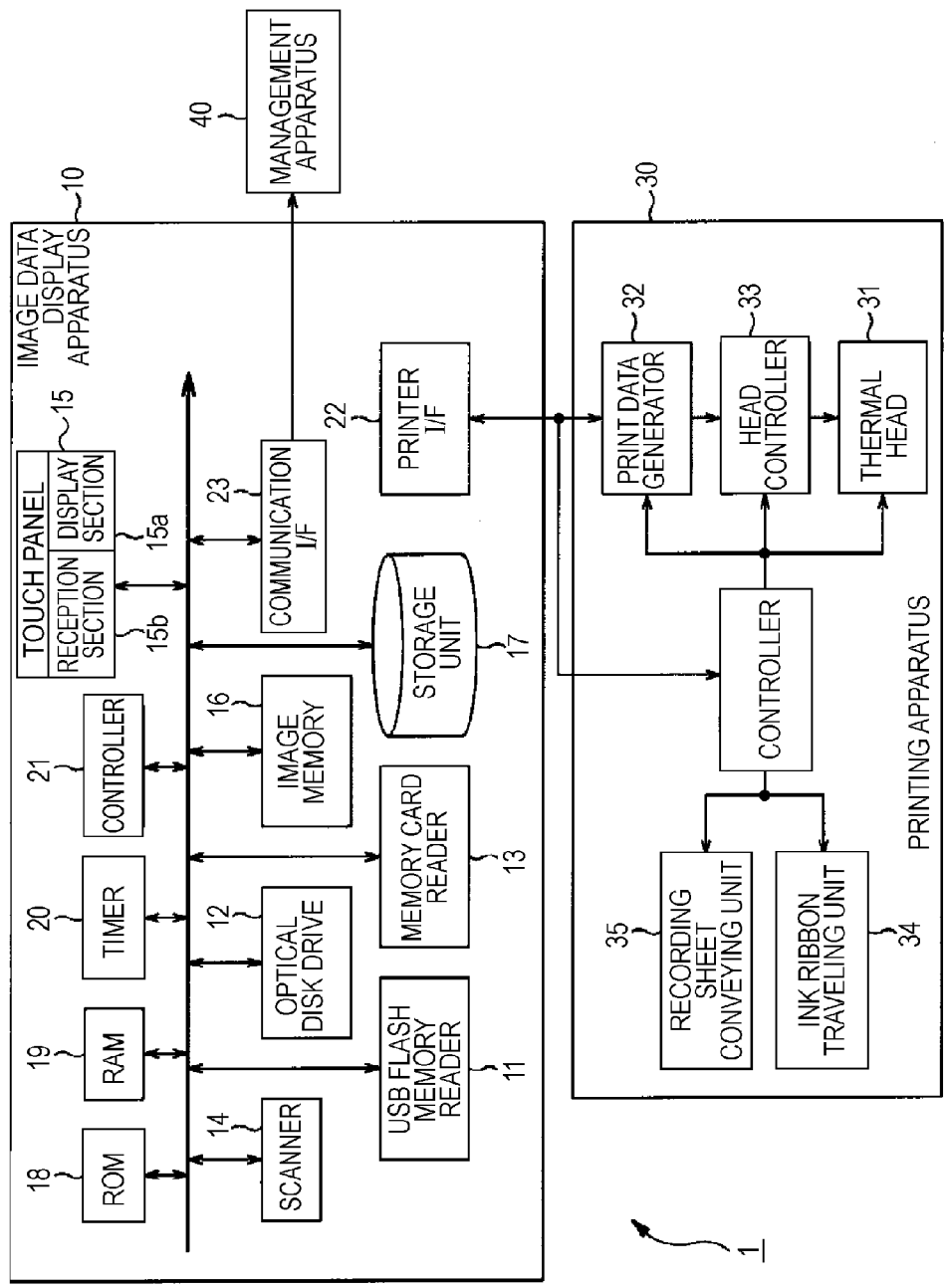
FIG. 2 is a block diagram showing the printing system.

Referring to FIG. 2, the image data display apparatus 10 constituting the printing system 1 includes various drives for reading data recorded on removable recording media provided by users. More specifically, the image data display apparatus 10 includes a universal serial bus (USB) flash memory reader 11, an optical disk drive 12, a memory card reader 13, and a scanner 14. The USB flash memory reader 11 reads, using a USB interface, image data stored in a semiconductor memory, such as a flash memory, serving as a storage element. The optical disk drive 12 reads image data from an optical disk, such as a compact disc (CD) or a digital versatile disk (DVD). The memory card reader 13 reads image data stored in a memory card including a semiconductor memory, such as a flash memory, serving as a storage element. The scanner 14 optically reads a picture provided by a user.

The image data display apparatus 10 also includes a touch panel 15, an image memory 16, a storage unit 17, a read-only memory (ROM) 18, a random-access memory (RAM) 19, a timer 20, and a controller 21. The touch panel 15 is operated by a user and displays image data received from the USB flash memory reader 11, the optical disk drive 12, the memory card reader 13, or the scanner 14. Image data to be displayed on the touch panel 15 is temporarily stored in the image memory 16. Log data regarding the number of copies to be printed, the number of times a template for a frame or the like to be provided around image data at the time of image printing is used, and the like is stored in the storage unit 17. A control program for controlling the entire operation, templates for frames and the like to be provided to image data, tables containing characters and symbols to be provided to image data, and a color table are stored in the ROM 18. The control program, a template for a selected frame, and the like are temporarily loaded into the RAM 19. The timer 20 measures a predetermined period of time. The controller 21 controls the entire operation on the basis of the control program and an operation signal received in accordance with an operation performed by a user.

The image data display apparatus 10 also includes a printer interface (I/F) 22 and a communication I/F 23. The printer I/F 22 outputs to the printing apparatus 30 image data to be printed. The communication I/F 23 communicates with an external management apparatus 40 or the like via a network, such as the Internet.

The touch panel 15 includes a display section 15a that displays image data and the like and a reception section 15b that generates an operation signal in accordance with an operation performed by a user. When the user touches a screen on the touch panel 15 with a finger or a dedicated pen, the touch panel 15 specifies a position on the screen by detecting the position where the finger or the dedicated pen touches. Then, the touch panel 15 outputs an operation signal to the controller 21. More specifically, the touch panel 15 specifies a position on the screen by sensing a change in pressure and sensing an electric signal caused by static electricity and generates an operation signal.

For example, a plurality of image data items stored in a USB flash memory, an optical disk, a memory card, or the like are displayed in the form of thumbnails on the touch panel 15, so that one or a plurality of thumbnail images can be selected from among the displayed thumbnail images.

The image memory 16 is a memory in which image data to be displayed on the touch panel 15 is stored. For example, when processing, such as zooming, moving of an area to be zoomed, rotation of image data, addition of text data such as characters, or combining of image data with a frame, is performed on a selected image data item, the processed image data item is stored in the image memory 16. Then, the image memory 16 outputs the processed image data item to the touch panel 15.

The storage unit 17 includes a hard disk or the like. Log data regarding printing and the like is recorded on the storage unit 17. For example, the number of selections of a frame to be combined with image data, the number of copies to be printed, and the like are stored as log data in the storage unit 17. When such log data is transmitted to the management apparatus 40, for example, an administrator is able to refer to such log data to learn the popularity rating of templates for frames and the like. Furthermore, for example, in the case where a user selects a template for a frame, popular templates can be preferentially displayed on a template selection screen. In addition, such log data may be stored in a removable recording medium inserted in the USB flash memory reader 11, the optical disk drive 12, the memory card reader 13, or the like. In the storage unit 17, data on frames and the like is also stored.

The ROM 18 includes an erasable programmable read-only memory (EP-ROM) or the like. A browser for implementing thumbnail display of read image data, a processing program for processing image data, and the like are stored in the ROM 18. Such various programs are read into the RAM 19 in accordance with an operation signal.

The timer 20 measures time and a predetermined period of time. For example, with the use of the timer 20, the above-mentioned log data is stored in association with printing time or the like in the storage unit 17. In addition, in the case of counting the number of copies to be printed or the number of selections within a predetermined period of time, the timer 20 measures the predetermined period of time, for example, one month.

The controller 21 includes a central processing unit (CPU) or the like. The controller 21 performs predetermined arithmetic processing based on a program in accordance with an operation signal and the like.

For example, when a predetermined unit image is selected on the touch panel 15, the controller 21 causes the selected image data item to enter a selected state and changes a display state of the selected image data item. In addition, when an instruction to perform processing on the selected image data item is issued, zooming processing, processing for moving an area to be zoomed, rotation of image data, addition of text data such as characters, processing for combining image data with a frame, or the like is performed on the selected image data item in accordance with an operation signal.

The printer I/F 22 is connected to the printing apparatus 30 in a wired or wireless manner, so that the printer I/F 22 can output to the printing apparatus 30 image data to be printed. In addition, the communication I/F 23 is connected, for example, to the management apparatus 40 via a network, such as the Internet. For example, in accordance with a predetermined protocol such as a transmission control protocol/internet protocol (TCP/IP), the communication I/F 23 transmits to the management apparatus 40 log data and the like stored in the storage unit 17.

As shown in FIG. 2, the printing apparatus 30 to be connected to the image data display apparatus 10 via the printer I/F 22 includes a thermal head 31, a print data generator 32, a head controller 33, an ink ribbon traveling unit 34, and a recording sheet conveying unit 35. The thermal head 31 forms a color image by sublimation of a dye of an ink ribbon on normal paper or the like. The print data generator 32 generates, on the basis of image data received from the printer I/F 22 of the image data display apparatus 10, print data to be printed. The head controller 33 drives the thermal head 31. The ink ribbon traveling unit 34 causes an ink ribbon to travel. The recording sheet conveying unit 35 conveys recording sheets.

In the thermal head 31, a plurality of heating elements are linearly arranged in a width direction of a roll sheet. Supplying driving currents based on print data to heating elements allows the heating elements to generate heat in a selective manner. The thermal head 31 faces a platen. When the thermal head 31 presses an ink ribbon into contact with a recording sheet and thermal energy is applied from the ink ribbon side, a dye or the like sublimates and is transferred onto the recording sheet.

The print data generator 32 converts image data into print data. More specifically, the print data generator 32 performs color conversion for converting image data into a YMC color space representing ink colors and performs predetermined processing, such as gamma conversion corresponding to the color development property of a roll sheet. Then, the head controller 33 generates a driving signal for the thermal head 31 in accordance with the print data generated by the print data generator 32. The head controller 33 supplies the generated driving signal to the thermal head 31 so as to drive the thermal head 31 in accordance with the image data to be printed.

The ink ribbon traveling unit 34 allows an ink ribbon wound around a feed reel and a wind reel to travel in a ribbon cartridge. For example, ink ribbons are arranged in a plane-sequential manner in a traveling direction in the order of yellow, cyan, and magenta laminate films. Thus, a single photograph can be formed using a set of yellow, cyan, and magenta laminate films on a recording sheet.

The recording sheet conveying unit 35 includes a feed roller and a plurality of driving rollers. The recording sheet conveying unit 35 conveys a recording sheet, such as a roll sheet, from a paper feeder unit to a paper ejection unit through the thermal head 31. In order to form an image on a recording sheet, it is necessary to transfer yellow, cyan, and magenta laminate films to the recording sheet in order. Thus, the recording sheet conveying unit 35 first causes the recording sheet to travel in synchronization with an ink ribbon, and yellow is thermally transferred to the recording sheet. Then, the recording sheet conveying unit 35 causes the recording sheet to travel in the reverse direction so that a leading edge of the recording sheet is returned to a position where traveling of the recording sheet starts, and cyan is thermally transferred onto yellow. Then, the recording sheet conveying unit 35 causes the recording sheet to travel in the reverse direction again so that the leading edge of the recording sheet is returned to the position where traveling of the recording sheet starts, and magenta is thermally transferred onto cyan. Accordingly, by repeatedly performing the above-described processing, yellow, cyan, and magenta laminate films can be thermally transferred to the recording sheet in that order.

Figure 3:
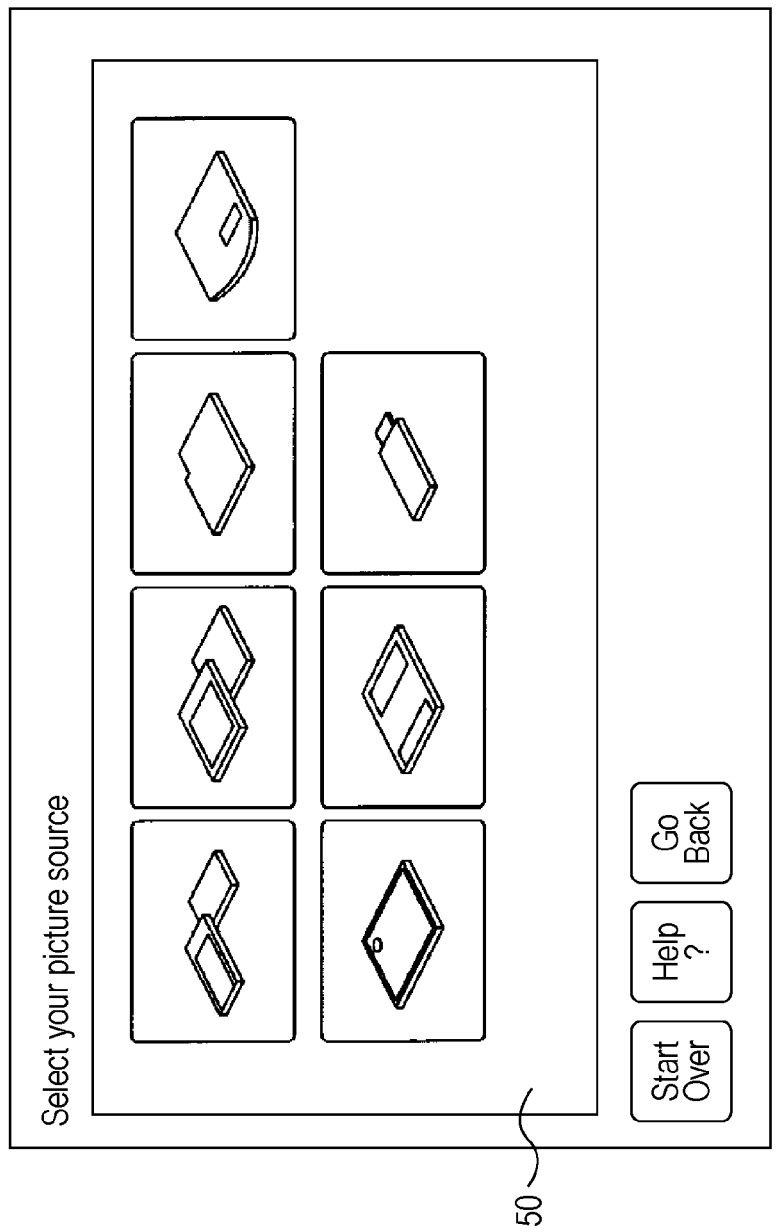
FIG. 3 illustrates a medium selection screen.

A process to read image data from a removable recording medium provided by a user and to display image data that can be printed on the touch panel 15 so that the user is able to select a desired image data item in the printing system 1 according to an embodiment of the present invention will now be described. In the image data display apparatus 10, in an operation standby state, a standby screen (not shown) is displayed on the display section 15a of the touch panel 15. When the user touches a start button displayed on the standby screen, a medium selection screen 50 shown in FIG. 3 is displayed.

The medium selection screen 50 is a screen on which the user can select a medium from which image data and print data are to be read. When the user touches an icon indicating a USB memory inserted in the USB flash memory reader 11, an optical disk inserted in the optical disk drive 12, or a memory card inserted in the memory card reader 13, a medium corresponding to the touched icon can be designated.

Figure 4:
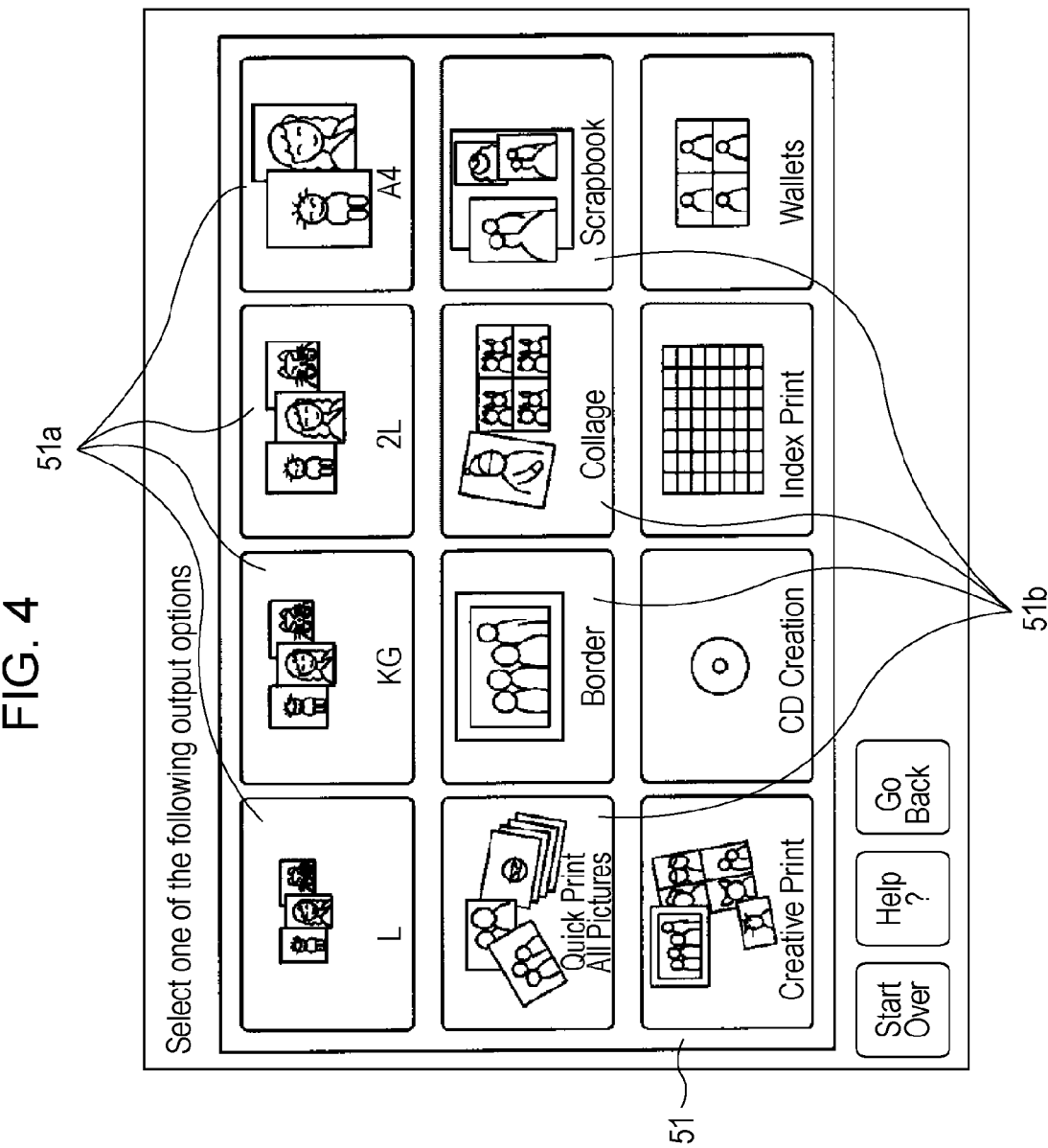
FIG. 4 illustrates a print menu screen.

After a medium from which image data is to be read is designated, a print menu screen 51 shown in FIG. 4 is displayed on the display section 15a. On the print menu screen 51, a method for printing read image data can be selected. For example, print size selection icons 51a indicating L size (127 mm×89 mm), KG size (postcard size) (152 mm×102 mm), 2L size (178 mm×127 mm), and A4 size (297 mm×210 mm) and special menu icons 51b indicating "Quick Print All Pictures", "Border", "College", "Scrapbook", and the like are displayed on the print menu screen 51.

The print size selection icons 51a are icons to be used for setting a print size. The controller 21 sets a selected size as a default size. Selected image data items are printed at the default size based on the selected print size selection icon 51a unless the user performs processing for changing the sizes of individual image data items.

When the "Quick Print All Pictures" icon is selected from among the special menu icons 51b, all the read image data items are printed. When the "Border" icon is selected, a read image data item is trimmed using a template for a frame or the like. When the "Collage" icon is selected, part of or the entire read image data item is cut and added to a different read image data item to form a single image to be printed. When the "Scrapbook" icon is selected, part of a read image data item is cut and attached, together with a different image data item, to a single print screen to be printed.

In addition, a "Creative Print" icon to be selected for performing editing such as "Border", "Collage", or "Scrapbook" for each image data item, a "CD Creation" icon to be selected for recording image data on an optical disk such as a CD-R, an "Index Print" icon to be selected for displaying and printing a list of all the images, and the like are displayed as the special menu icons 51b. The sizes of the print size selection icons 51a and the menu of the special menu icons 51b can be added, changed, or eliminated in an appropriate manner.

In the image data display apparatus 10, when a user touches one of the print size selection icons 51a, the controller 21 reads image data items stored in a designated removable storage medium so that the read image data items are displayed in the form of thumbnails on the display section 15a of the touch panel 15, and the read image data items are stored in the image memory 16. At the same time, the controller 21 also reads print data stored in the removable storage medium, stores the read print data in the image memory 16, and extracts image data items to which printing conditions are attached.

Here, print data is a data standard for printing image data. Print data corresponds, for example, to a DPOF file. DPOF includes an automatic print file containing various types of information to be used when an image captured with an image capturing device, such as a digital still camera, is printed. By reading such an automatic print file, desired printing can be automatically performed without setting various printing conditions every time printing is performed. More specifically, in a DPOF file, the type of an image capturing device, the date and time the file was created, header information including a user name and the like, and job information including a print product identifier (ID), the size of printing, the type of paper, the number of copies to be printed, the format of the file, conditions regarding printing of date and time and a title, and designation of trimming and rotation are described.

Figure 5:
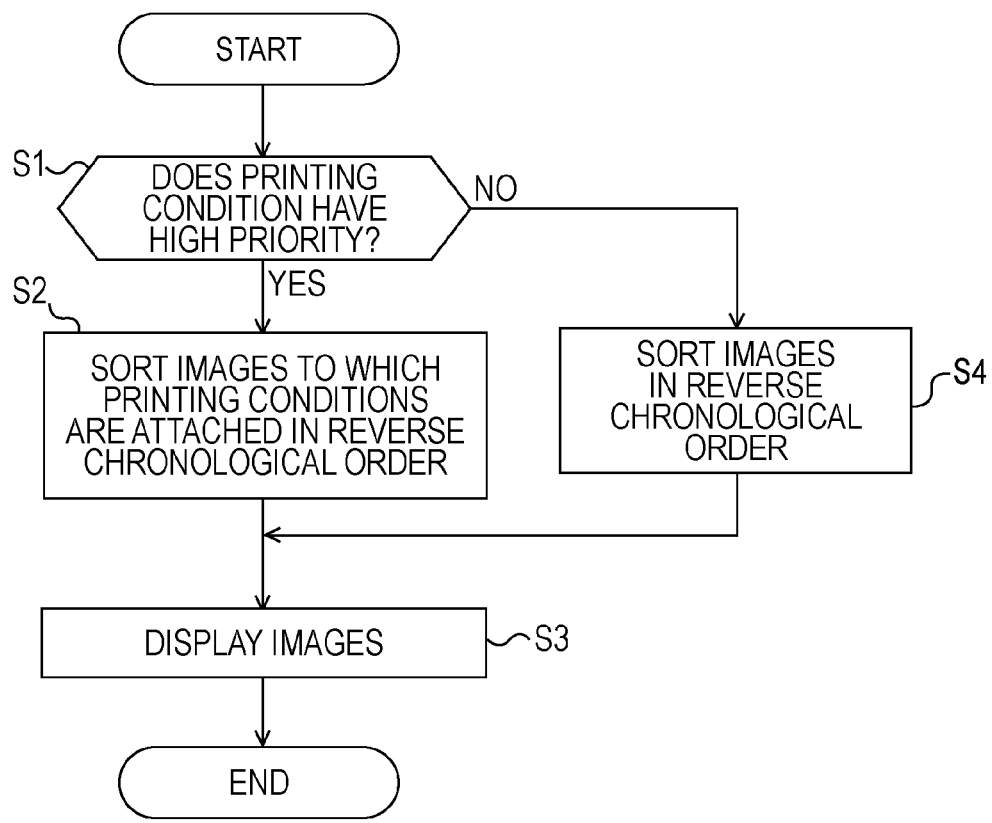
FIG. 5 is a flowchart showing a process to determine an order in which image data items are displayed.
Figure 6:
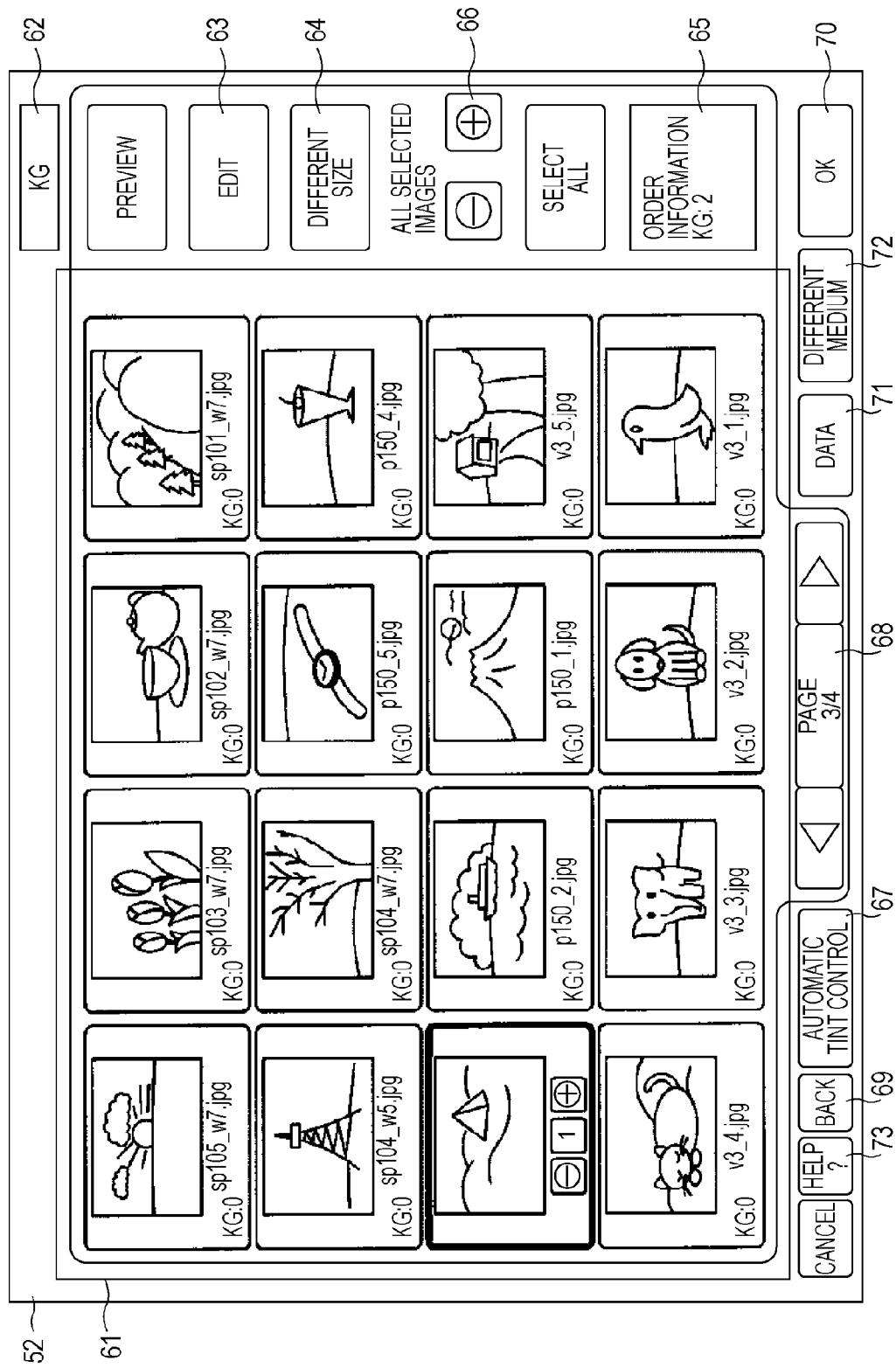
FIG. 6 illustrates a touch panel on which image data items are displayed in the form of thumbnails.

The controller 21 extracts from the image memory 16 image data items to which such print data is attached, and first displays, in accordance with a flowchart shown in FIG. 5, on an image-to-be-printed selection screen 52 shown in FIG. 6 the image data items to which such print data is attached. That is, since an image data item to which print data is attached is more likely to be printed compared with an image data item to which print data is not attached, in the case of generating a list of thumbnails to be displayed, image data items to which print data is attached are preferentially displayed. Thus, the user is able to first view image data items that are highly likely to be printed. Therefore, the user is able to efficiently find, from among a large number of image data items stored in a memory card, an image data item that the user wants to print.

More specifically, in step S1, the controller 21 determines whether a preferential display mode in which an image data item to which print data is attached is preferentially displayed is set. If it is determined in step S1 that the preferential display mode is set, the process proceeds to step S2. In step S2, the controller 21 extracts, from among image data items stored in the image memory 16, image data items to which print data is attached, and rearranges the extracted image data items in an order which is the reverse of the order in which the image data items were captured. Then, in step S3, the controller 21 displays the extracted image data items in the order which is the reverse of the order in which the image data items were captured in a thumbnail display field 61 of the image-to-be-printed selection screen 52 and then displays image data items to which print data is not attached.

That is, it is assumed that, from among the image data items to which print data is attached, recently captured image data items are highly likely to be printed. Thus, the image data display apparatus 10 displays image data items in the order which is the reverse of the order in which the image data items were captured, so that the user can efficiently find an image data item that the user wants to print. More specifically, in the thumbnail display field 61, for example, thumbnails arranged in four rows and four columns are displayed. The most recently captured image to which print data is attached is displayed in the leftmost column in the uppermost row, and the second most recently captured image to which print data is attached is displayed to the immediate right of the most recently captured image to which print data is attached. In the thumbnail display field 61, thumbnails are sequentially displayed in a rightward direction. The fifth most recently captured image to which print data is attached and the subsequent images are sequentially displayed from the leftmost column in the second row to the rightward direction.

If it is determined in step S1 that the preferential display mode in which image data items are displayed on the basis of print data is not adopted, the image data display apparatus 10 proceeds to step S4. In step S4, the controller 21 rearranges all the image data items stored in the image memory 16 in the order which is the reverse of the order in which the image data items were captured. Then, in step S3, all the image data items are displayed in the thumbnail display field 61 of the image-to-be-printed selection screen 52 in the order which is the reverse of the order in which the image data items are captured. Accordingly, irrespective of whether or not print data is attached, recently captured image data items that are highly likely to be printed are preferentially displayed. Thus, the user is able to efficiently find an image data item that the user wants to print.

When image data items are displayed in the form of thumbnails as described above, the user specifies image data items by touching thumbnails of the image data items to be actually printed and performs settings regarding the number of copies to be printed and the like and various types of editing. The image-to-be-printed selection screen 52 shown in FIG. 6 on which image data items are displayed in the form of thumbnails will now be described. On the image-to-be-printed selection screen 52, the thumbnail display field 61, a print size display field 62, an edit button 63, a size change button 64, a size information display field 65, a number-of-copies-to-be-printed setting button 66, an automatic tint control button 67, a page move button 68, and a back button 69 are displayed. In the thumbnail display field 61, thumbnails of image data items are displayed. In the print size display field 62, a print size selected on the print menu screen 51 is displayed. When the edit button 63 is touched, an edit screen on which an image data item corresponding to a designated thumbnail can be edited is displayed. When the size change button 64 is touched, a print size different from the print size displayed in the print size display field 62 can be set. In the size information display field 65, the number of copies to be printed is displayed for each size. With the use of the number-of-copies-to-be-printed setting button 66, the number of copies to be printed for all the selected image data items can be collectively adjusted. With the use of the automatic tint control button 67, automatic tint correction for all the selected image data items can be collectively performed. In the case that the image-to-be-printed selection screen 52 contains a plurality of pages, with the use of the page move button 68, a page different from the page currently displayed on the current image-to-be-printed selection screen 52 can be displayed. When the back button 69 is touched, the print menu screen 51 is displayed. In addition, on the image-to-be-printed selection screen 52, a selection end button 70, a date display button 71, a medium selection button 72, and a help button 73 are displayed. When the selection end button 70 is touched, designation of images to be printed on the image-to-be-printed selection screen 52 is terminated and an order confirmation screen is displayed. When the date display button 71 is touched, the print date and time is uniformly displayed on printed pictures corresponding to the selected image data items. When the medium selection button 72 is touched, data can be read from a different medium. The help button 73 can be used in a case where the user does not know which operation is to be performed.

In the thumbnail display field 61, from among image data items read from a memory card, image data items to which print data is attached are displayed in an order which is the reverse of the order in which the image data items were captured. When the user touches a thumbnail image that the user wants to print, the controller 21 causes the selected thumbnail image to enter a selected state by displaying the display frame of the selected thumbnail image thicker than display frames of the other thumbnail images or displaying the background of the display frame of the selected thumbnail image in a color different from those of the backgrounds of the display frames of the other thumbnail images. At the same time, the controller 21 displays a "+ button" and an "− button" to be used for increasing and decreasing the number of copies to be printed. In this state, the controller 21 displays the edit screen on which the selected image data item can be edited when the edit button 63 is touched, and the controller 21 displays a size change screen on which the size of the selected image data item can be changed when the size change button 64 is touched. Here, when an image data item enters a selected state, the number of copies of the selected image data item to be printed is automatically set to "1". When the "+ button" or the "− button" is touched, the number of copies to be printed can be increased or decreased in accordance with the number of times the button is touched.

After selection of images, various types of editing, and settings regarding the number of copies to be printed and print size are completed and the selection end button 70 is touched, the controller 21 displays the order confirmation screen on which the number of ordered copies and the fee are displayed for each print size and the total fee is displayed. In addition, the controller 21 stores the edited image data items in the image memory 16. When an OK button on the order confirmation screen is touched, the controller 21 transmits the edited image data items to the printing apparatus 30. Thus, a controller of the printing apparatus 30 generates print data on the basis of the received image data items. Then, the printing apparatus 30 drives the thermal head 31, the ink ribbon traveling unit 34, and the recording sheet conveying unit 35 in accordance with the print data, and prints on sheets having designated sizes pictures corresponding to the edited image data items.

It should be understood by those skilled in the art that various modifications, combinations, sub-combinations and alterations may occur depending on design requirements and other factors insofar as they are within the scope of the appended claims or the equivalents thereof.

What is claimed is:

1. An image data display apparatus comprising:
a display configured to display images to be printed in the form of thumbnails;
a memory configured to receive and store first and second types of image data items, the first type of image data items including image data with print settings attached therein, the second type of image data items including image data without print settings attached therein; and
a controller, coupled to the display and the memory, configured to determine a display order of the images on the display in the form of thumbnails based on the first and second types of image data items, the display order being such that the first type of image data items are displayed in a sequential arrangement in the form of thumbnails on the display sequentially before the thumbnails of the second type of image data items are displayed in the sequential arrangement,
wherein,
the controller displays on the display the first type of image data items in the form of thumbnails in an order which is reverse of an order in which the first type of image data items were captured by an image capturing device, and
the controller displays on the display the second type of image data items in the form of thumbnails in an order which is reverse of an order in which the second type of image data items were captured by the image capturing device.

2. The image display apparatus as recited in claim 1, wherein the print settings comprises a type of the image capturing device, a print product identifier, a print size, and a number of copies to be printed.

3. The image data display apparatus as recited in claim 1, further comprising a storage unit, coupled to the controller, for storing log data which includes a number of selections of a frame to be combined with each image data.

4. The image data display apparatus as recited in claim 1, wherein the display is a touch panel that is configured to receive one or more selections of specific thumbnails of one or more of at least one of the first and second image data items to be printed.

5. The image display apparatus as recited in claim 1, wherein:
the controller determines if a preferential display mode is selected,
if the preferential display mode is selected, then the images in the form of thumbnails are displayed on the display according to the display order, and
if the preferential display mode is not selected, then the images in the form of thumbnails are displayed on the display based on when the images were captured.

6. An image data display method, comprising:
receiving a first type of image data items and a second type of image data items, the first type of image data items including image data with print settings attached therein and the second type of image data items including image data without print settings attached therein;
storing the received first and second types of image data items into a memory;
extracting by a controller from the memory the first and second types of image data items; and
displaying, in the form of thumbnails on a display, the first type of image data items and the second type of image data items in a display order, the display order being such that the first type of image data items are displayed in a sequential arrangement in the form of thumbnails on the display sequentially before the thumbnails of the second type of image data items are displayed in the sequential arrangement
wherein,
the controller displays on the display the first type of image data items in the form of thumbnails in an order which is reverse of an order in which the first type of image data items were captured by an image capturing device, and
the controller displays on the display the second type of image data items in the form of thumbnails in an order which is reverse of an order in which the second type of image data items were captured by the image capturing device.

7. A computer program product comprising a non-transitory computer-readable medium having computer program instructions, when executed, causes a processor to perform a method that comprises:

receiving a first type of image data items and a second type of image data items, the first type of image data items including image data with print settings attached therein and the second type of image data items including image data without print settings attached therein;

storing the received first and second types of image data items into a memory; and determining a display order in which the first type of image data items and the second type of image data items are to be displayed on a display in the form of thumbnails, the display order being such that the first type of image data items are displayed in a sequential arrangement in the form of thumbnails on the display sequentially before the thumbnails of the second type of image data items are displayed in the sequential arrangement, wherein, the controller displays on the display the first type of image data items in the form of thumbnails in an order which is reverse of an order in which the first type of image data items were captured by an image capturing device, and the controller displays on the display the second type of image data items in the form of thumbnails in an order which is reverse of an order in which the second type of image data items were captured by the image capturing device.

* * * * *